US009124864B2

(12) United States Patent
Mullis

(10) Patent No.: US 9,124,864 B2
(45) Date of Patent: *Sep. 1, 2015

(54) SYSTEM AND METHODS FOR CALIBRATION OF AN ARRAY CAMERA

(71) Applicant: Pelican Imaging Corporation, Santa Clara, CA (US)

(72) Inventor: Robert Mullis, Santa Cruz, CA (US)

(73) Assignee: Pelican Imaging Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/519,005

(22) Filed: Oct. 20, 2014

(65) Prior Publication Data

US 2015/0035992 A1 Feb. 5, 2015

Related U.S. Application Data

(63) Continuation of application No. 13/792,143, filed on Mar. 10, 2013, now Pat. No. 8,866,912.

(51) Int. Cl.
*H04N 17/00* (2006.01)
*H04N 5/232* (2006.01)
*H04N 13/02* (2006.01)

(52) U.S. Cl.
CPC ......... *H04N 17/002* (2013.01); *H04N 5/23245* (2013.01); *H04N 13/0242* (2013.01); *H04N 13/0246* (2013.01)

(58) Field of Classification Search
CPC . H04N 17/002; H04N 17/00; H04N 5/23238; H04N 7/181; G06T 7/0095
USPC .......... 348/187, 188, 175, 218.1, 135, 47, 48; 700/258, 259; 702/104, 116; 382/103, 382/106, 107, 153, 154, 284
See application file for complete search history.

(56) References Cited

U.S. PATENT DOCUMENTS 4,124,798 A 11/1978 Thompson
4,198,646 A 4/1980 Alexander et al.
(Continued)

FOREIGN PATENT DOCUMENTS

EP 840502 A2 5/1998
EP 2336816 A2 6/2011
(Continued)

OTHER PUBLICATIONS

Chan et al., "Extending the Depth of Field in a Compound-Eye Imaging System with Super-Resolution Reconstruction", Proceedings—International Conference on Pattern Recognition, 2006, vol. 3, pp. 623-626.

(Continued)

*Primary Examiner* — Victor Kostak
(74) *Attorney, Agent, or Firm* — KPPB LLP

(57) ABSTRACT

Systems and methods for calibrating an array camera are disclosed. Systems and methods for calibrating an array camera in accordance with embodiments of this invention include the capturing of an image of a test pattern with the array camera such that each imaging component in the array camera captures an image of the test pattern. The image of the test pattern captured by a reference imaging component is then used to derive calibration information for the reference component. A corrected image of the test pattern for the reference component is then generated from the calibration information and the image of the test pattern captured by the reference imaging component. The corrected image is then used with the images captured by each of the associate imaging components associated with the reference component to generate calibration information for the associate imaging components.

16 Claims, 5 Drawing Sheets

(56) References Cited

U.S. PATENT DOCUMENTS

| | | |
|---|---|---|
| 4,323,925 A | 4/1982 | Abell et al. |
| 4,460,449 A | 7/1984 | Montalbano |
| 4,467,365 A | 8/1984 | Murayama et al. |
| 5,005,083 A | 4/1991 | Grage |
| 5,070,414 A | 12/1991 | Tsutsumi |
| 5,144,448 A | 9/1992 | Hornbaker |
| 5,629,524 A | 5/1997 | Stettner et al. |
| 5,808,350 A | 9/1998 | Jack et al. |
| 5,832,312 A | 11/1998 | Rieger et al. |
| 5,880,691 A | 3/1999 | Fossum et al. |
| 5,933,190 A | 8/1999 | Dierickx et al. |
| 5,973,844 A | 10/1999 | Burger |
| 6,002,743 A * | 12/1999 | Telymonde .................. 378/98.8 |
| 6,034,690 A | 3/2000 | Gallery et al. |
| 6,069,351 A | 5/2000 | Mack |
| 6,069,365 A | 5/2000 | Chow et al. |
| 6,097,394 A | 8/2000 | Levoy et al. |
| 6,124,974 A | 9/2000 | Burger |
| 6,137,535 A | 10/2000 | Meyers |
| 6,141,048 A | 10/2000 | Meyers |
| 6,160,909 A | 12/2000 | Melen |
| 6,205,241 B1 | 3/2001 | Melen |
| 6,358,862 B1 | 3/2002 | Ireland et al. |
| 6,603,513 B1 | 8/2003 | Berezin |
| 6,611,289 B1 | 8/2003 | Yu |
| 6,627,896 B1 | 9/2003 | Hashimoto et al. |
| 6,635,941 B2 | 10/2003 | Suda |
| 6,671,399 B1 | 12/2003 | Berestov |
| 6,750,904 B1 | 6/2004 | Lambert |
| 6,765,617 B1 | 7/2004 | Tangen et al. |
| 6,771,833 B1 | 8/2004 | Edgar |
| 6,774,941 B1 | 8/2004 | Boisvert et al. |
| 6,819,358 B1 | 11/2004 | Kagle et al. |
| 6,879,735 B1 | 4/2005 | Portniaguine et al. |
| 6,903,770 B1 | 6/2005 | Kobayashi et al. |
| 6,909,121 B2 | 6/2005 | Nishikawa |
| 6,958,862 B1 | 10/2005 | Joseph |
| 7,085,409 B2 | 8/2006 | Sawhney et al. |
| 7,199,348 B2 | 4/2007 | Olsen et al. |
| 7,262,799 B2 | 8/2007 | Suda |
| 7,292,735 B2 | 11/2007 | Blake et al. |
| 7,295,697 B1 | 11/2007 | Satoh |
| 7,369,165 B2 | 5/2008 | Bosco et al. |
| 7,391,572 B2 | 6/2008 | Jacobowitz et al. |
| 7,606,484 B1 | 10/2009 | Richards et al. |
| 7,633,511 B2 | 12/2009 | Shum et al. |
| 7,657,090 B2 | 2/2010 | Omatsu et al. |
| 7,675,080 B2 | 3/2010 | Boettiger |
| 7,675,681 B2 | 3/2010 | Tomikawa et al. |
| 7,706,634 B2 * | 4/2010 | Schmitt et al. ................. 382/294 |
| 7,723,662 B2 | 5/2010 | Levoy et al. |
| 7,782,364 B2 | 8/2010 | Smith |
| 7,912,673 B2 | 3/2011 | Hébert et al. |
| 7,986,018 B2 | 7/2011 | Rennie |
| 7,990,447 B2 | 8/2011 | Honda et al. |
| 8,013,904 B2 * | 9/2011 | Tan et al. ................... 348/222.1 |
| 8,027,531 B2 | 9/2011 | Wilburn et al. |
| 8,044,994 B2 | 10/2011 | Vetro et al. |
| 8,077,245 B2 | 12/2011 | Adamo et al. |
| 8,098,304 B2 | 1/2012 | Pinto et al. |
| 8,106,949 B2 * | 1/2012 | Tan et al. ..................... 348/180 |
| 8,126,279 B2 | 2/2012 | Marcellin et al. |
| 8,131,097 B2 | 3/2012 | Lelescu et al. |
| 8,164,629 B1 | 4/2012 | Zhang |
| 8,180,145 B2 | 5/2012 | Wu et al. |
| 8,189,089 B1 | 5/2012 | Georgiev |
| 8,213,711 B2 | 7/2012 | Tam |
| 8,231,814 B2 | 7/2012 | Duparre |
| 8,242,426 B2 | 8/2012 | Ward et al. |
| 8,294,099 B2 | 10/2012 | Blackwell, Jr. |
| 8,305,456 B1 | 11/2012 | McMahon |
| 8,315,476 B1 | 11/2012 | Georgiev et al. |
| 8,345,144 B1 | 1/2013 | Georgiev et al. |
| 8,360,574 B2 | 1/2013 | Ishak et al. |
| 8,400,555 B1 | 3/2013 | Georgiev |
| 8,406,562 B2 * | 3/2013 | Bassi et al. .................... 382/275 |
| 8,446,492 B2 | 5/2013 | Nakano et al. |
| 8,514,491 B2 | 8/2013 | Duparre |
| 8,541,730 B2 | 9/2013 | Inuiya |
| 8,542,933 B2 | 9/2013 | Venkataraman et al. |
| 8,619,082 B1 | 12/2013 | Ciurea et al. |
| 8,692,893 B2 | 4/2014 | McMahon |
| 8,773,536 B1 | 7/2014 | Zhang |
| 8,780,113 B1 | 7/2014 | Ciurea et al. |
| 8,804,255 B2 | 8/2014 | Duparre |
| 8,831,367 B2 | 9/2014 | Venkataraman et al. |
| 8,861,089 B2 | 10/2014 | Duparre |
| 8,866,912 B2 | 10/2014 | Mullis |
| 8,878,950 B2 | 11/2014 | Lelescu et al. |
| 2001/0005225 A1 | 6/2001 | Clark et al. |
| 2001/0038387 A1 | 11/2001 | Tomooka et al. |
| 2002/0012056 A1 | 1/2002 | Trevino |
| 2002/0027608 A1 * | 3/2002 | Johnson et al. ................ 348/383 |
| 2002/0063807 A1 | 5/2002 | Margulis |
| 2002/0087403 A1 | 7/2002 | Meyers et al. |
| 2002/0089596 A1 | 7/2002 | Suda |
| 2002/0094027 A1 | 7/2002 | Sato et al. |
| 2002/0101528 A1 | 8/2002 | Lee et al. |
| 2002/0113867 A1 | 8/2002 | Takigawa et al. |
| 2002/0113888 A1 | 8/2002 | Sonoda et al. |
| 2002/0163054 A1 | 11/2002 | Suda et al. |
| 2002/0167537 A1 | 11/2002 | Trajkovic |
| 2002/0177054 A1 | 11/2002 | Saitoh et al. |
| 2003/0086079 A1 | 5/2003 | Barth et al. |
| 2003/0124763 A1 | 7/2003 | Fan et al. |
| 2003/0140347 A1 | 7/2003 | Varsa |
| 2003/0179418 A1 | 9/2003 | Wengender et al. |
| 2003/0211405 A1 | 11/2003 | Venkataraman |
| 2004/0008271 A1 | 1/2004 | Hagimori et al. |
| 2004/0012689 A1 | 1/2004 | Tinnerino |
| 2004/0047274 A1 | 3/2004 | Amanai |
| 2004/0050104 A1 | 3/2004 | Ghosh et al. |
| 2004/0056966 A1 | 3/2004 | Schechner et al. |
| 2004/0100570 A1 | 5/2004 | Shizukuishi |
| 2004/0114807 A1 | 6/2004 | Lelescu et al. |
| 2004/0165090 A1 | 8/2004 | Ning |
| 2004/0169617 A1 | 9/2004 | Yelton et al. |
| 2004/0170340 A1 | 9/2004 | Tipping et al. |
| 2004/0174439 A1 | 9/2004 | Upton |
| 2004/0179834 A1 | 9/2004 | Szajewski |
| 2004/0207836 A1 | 10/2004 | Chhibber et al. |
| 2004/0213449 A1 * | 10/2004 | Safaee-Rad et al. .......... 382/141 |
| 2004/0218809 A1 | 11/2004 | Blake et al. |
| 2004/0234873 A1 | 11/2004 | Venkataraman |
| 2004/0251509 A1 | 12/2004 | Choi |
| 2005/0006477 A1 | 1/2005 | Patel |
| 2005/0012035 A1 | 1/2005 | Miller |
| 2005/0036778 A1 | 2/2005 | DeMonte |
| 2005/0048690 A1 | 3/2005 | Yamamoto |
| 2005/0068436 A1 | 3/2005 | Fraenkel et al. |
| 2005/0132098 A1 | 6/2005 | Sonoda et al. |
| 2005/0134712 A1 | 6/2005 | Gruhlke et al. |
| 2005/0151759 A1 | 7/2005 | Gonzalez-Banos et al. |
| 2005/0205785 A1 | 9/2005 | Hornback et al. |
| 2005/0219363 A1 * | 10/2005 | Kohler et al. ................. 348/187 |
| 2005/0225654 A1 | 10/2005 | Feldman et al. |
| 2005/0286612 A1 | 12/2005 | Takanashi |
| 2006/0002635 A1 | 1/2006 | Nestares et al. |
| 2006/0023197 A1 | 2/2006 | Joel |
| 2006/0023314 A1 | 2/2006 | Boettiger et al. |
| 2006/0033005 A1 | 2/2006 | Jerdev et al. |
| 2006/0038891 A1 | 2/2006 | Okutomi et al. |
| 2006/0049930 A1 | 3/2006 | Zruya et al. |
| 2006/0054780 A1 | 3/2006 | Garrood et al. |
| 2006/0054782 A1 | 3/2006 | Olsen et al. |
| 2006/0072029 A1 | 4/2006 | Miyatake et al. |
| 2006/0087747 A1 | 4/2006 | Ohzawa et al. |
| 2006/0098888 A1 | 5/2006 | Morishita |
| 2006/0125936 A1 | 6/2006 | Gruhike et al. |
| 2006/0138322 A1 | 6/2006 | Costello et al. |
| 2006/0159369 A1 | 7/2006 | Young |
| 2006/0176566 A1 | 8/2006 | Boettiger et al. |
| 2006/0187338 A1 | 8/2006 | May et al. |
| 2006/0197937 A1 | 9/2006 | Bamji et al. |

(56) References Cited

U.S. PATENT DOCUMENTS

| | | |
|---|---|---|
| 2006/0210186 A1 | 9/2006 | Berkner |
| 2006/0243889 A1 | 11/2006 | Farnworth et al. |
| 2006/0251410 A1 | 11/2006 | Trutna |
| 2006/0274174 A1 | 12/2006 | Tewinkle |
| 2006/0278948 A1 | 12/2006 | Yamaguchi et al. |
| 2006/0279648 A1 | 12/2006 | Senba et al. |
| 2007/0002159 A1 | 1/2007 | Olsen et al. |
| 2007/0024614 A1 | 2/2007 | Tam et al. |
| 2007/0040828 A1 | 2/2007 | Zalevsky et al. |
| 2007/0040922 A1 | 2/2007 | McKee et al. |
| 2007/0041391 A1 | 2/2007 | Lin et al. |
| 2007/0052825 A1 | 3/2007 | Cho |
| 2007/0083114 A1 | 4/2007 | Yang et al. |
| 2007/0085917 A1 | 4/2007 | Kobayashi |
| 2007/0102622 A1 | 5/2007 | Olsen et al. |
| 2007/0126898 A1 | 6/2007 | Feldman et al. |
| 2007/0127831 A1 | 6/2007 | Venkataraman |
| 2007/0139333 A1 | 6/2007 | Sato et al. |
| 2007/0146511 A1 | 6/2007 | Kinoshita et al. |
| 2007/0159541 A1 | 7/2007 | Sparks et al. |
| 2007/0160310 A1 | 7/2007 | Tanida et al. |
| 2007/0171290 A1 | 7/2007 | Kroger |
| 2007/0211164 A1 | 9/2007 | Olsen et al. |
| 2007/0216765 A1 | 9/2007 | Wong et al. |
| 2007/0228256 A1 | 10/2007 | Mentzer |
| 2007/0257184 A1 | 11/2007 | Olsen et al. |
| 2007/0258006 A1 | 11/2007 | Olsen et al. |
| 2007/0258706 A1 | 11/2007 | Raskar et al. |
| 2007/0268374 A1 | 11/2007 | Robinson |
| 2007/0296835 A1 | 12/2007 | Olsen et al. |
| 2008/0019611 A1* | 1/2008 | Larkin et al. .................. 382/287 |
| 2008/0025649 A1 | 1/2008 | Liu et al. |
| 2008/0030597 A1 | 2/2008 | Olsen et al. |
| 2008/0043095 A1 | 2/2008 | Vetro et al. |
| 2008/0043096 A1 | 2/2008 | Vetro et al. |
| 2008/0080028 A1 | 4/2008 | Bakin et al. |
| 2008/0084486 A1 | 4/2008 | Enge et al. |
| 2008/0088793 A1 | 4/2008 | Sverdrup et al. |
| 2008/0095523 A1 | 4/2008 | Schilling-Benz et al. |
| 2008/0118241 A1 | 5/2008 | Tekolste et al. |
| 2008/0131019 A1 | 6/2008 | Ng |
| 2008/0131107 A1 | 6/2008 | Ueno |
| 2008/0151097 A1 | 6/2008 | Chen et al. |
| 2008/0152215 A1 | 6/2008 | Horie et al. |
| 2008/0152296 A1 | 6/2008 | Oh et al. |
| 2008/0193026 A1 | 8/2008 | Horie et al. |
| 2008/0218610 A1 | 9/2008 | Chapman et al. |
| 2008/0219654 A1 | 9/2008 | Border et al. |
| 2008/0247638 A1 | 10/2008 | Tanida et al. |
| 2008/0247653 A1 | 10/2008 | Moussavi et al. |
| 2008/0278591 A1 | 11/2008 | Barna et al. |
| 2008/0298674 A1 | 12/2008 | Baker et al. |
| 2009/0050946 A1 | 2/2009 | Duparre et al. |
| 2009/0052743 A1 | 2/2009 | Techmer |
| 2009/0060281 A1 | 3/2009 | Tanida et al. |
| 2009/0086074 A1 | 4/2009 | Li et al. |
| 2009/0091806 A1 | 4/2009 | Inuiya |
| 2009/0102956 A1 | 4/2009 | Georgiev |
| 2009/0109306 A1 | 4/2009 | Shan et al. |
| 2009/0128833 A1 | 5/2009 | Yahav |
| 2009/0167922 A1 | 7/2009 | Perlman et al. |
| 2009/0179142 A1 | 7/2009 | Duparre et al. |
| 2009/0180021 A1 | 7/2009 | Kikuchi et al. |
| 2009/0200622 A1 | 8/2009 | Tai et al. |
| 2009/0201371 A1 | 8/2009 | Matsuda et al. |
| 2009/0207235 A1 | 8/2009 | Francini et al. |
| 2009/0225203 A1 | 9/2009 | Tanida et al. |
| 2009/0237520 A1 | 9/2009 | Kaneko et al. |
| 2009/0268192 A1 | 10/2009 | Koenck et al. |
| 2009/0268983 A1 | 10/2009 | Stone |
| 2009/0274387 A1 | 11/2009 | Jin |
| 2009/0284651 A1 | 11/2009 | Srinivasan |
| 2009/0297056 A1 | 12/2009 | Lelescu et al. |
| 2009/0302205 A9 | 12/2009 | Olsen et al. |
| 2009/0323195 A1 | 12/2009 | Hembree et al. |
| 2009/0323206 A1 | 12/2009 | Oliver et al. |
| 2009/0324118 A1 | 12/2009 | Maslov et al. |
| 2010/0002126 A1 | 1/2010 | Wenstrand et al. |
| 2010/0002313 A1 | 1/2010 | Duparre et al. |
| 2010/0002314 A1 | 1/2010 | Duparre |
| 2010/0053342 A1 | 3/2010 | Hwang et al. |
| 2010/0053600 A1 | 3/2010 | Tanida et al. |
| 2010/0060746 A9 | 3/2010 | Olsen et al. |
| 2010/0086227 A1 | 4/2010 | Sun et al. |
| 2010/0097491 A1 | 4/2010 | Farina et al. |
| 2010/0103259 A1 | 4/2010 | Tanida et al. |
| 2010/0103308 A1 | 4/2010 | Butterfield et al. |
| 2010/0111444 A1 | 5/2010 | Coffman |
| 2010/0118127 A1 | 5/2010 | Nam et al. |
| 2010/0141802 A1 | 6/2010 | Knight et al. |
| 2010/0142839 A1 | 6/2010 | Lakus-Becker |
| 2010/0157073 A1 | 6/2010 | Kondo et al. |
| 2010/0177411 A1 | 7/2010 | Hegde et al. |
| 2010/0195716 A1 | 8/2010 | Gunnewiek et al. |
| 2010/0201834 A1 | 8/2010 | Maruyama et al. |
| 2010/0208100 A9 | 8/2010 | Olsen et al. |
| 2010/0220212 A1 | 9/2010 | Perlman et al. |
| 2010/0231285 A1 | 9/2010 | Boomer et al. |
| 2010/0244165 A1 | 9/2010 | Lake et al. |
| 2010/0265385 A1 | 10/2010 | Knight et al. |
| 2010/0281070 A1 | 11/2010 | Chan et al. |
| 2010/0302423 A1 | 12/2010 | Adams, Jr. et al. |
| 2011/0001037 A1 | 1/2011 | Tewinkle |
| 2011/0018973 A1 | 1/2011 | Takayama |
| 2011/0032370 A1* | 2/2011 | Ludwig ...................... 348/218.1 |
| 2011/0043661 A1 | 2/2011 | Podoleanu |
| 2011/0043665 A1 | 2/2011 | Ogasahara |
| 2011/0043668 A1 | 2/2011 | McKinnon et al. |
| 2011/0069189 A1 | 3/2011 | Venkataraman et al. |
| 2011/0080487 A1 | 4/2011 | Venkataraman et al. |
| 2011/0108708 A1 | 5/2011 | Olsen et al. |
| 2011/0121421 A1 | 5/2011 | Charbon et al. |
| 2011/0122308 A1 | 5/2011 | Duparre |
| 2011/0153248 A1 | 6/2011 | Gu et al. |
| 2011/0157321 A1 | 6/2011 | Nakajima et al. |
| 2011/0211824 A1 | 9/2011 | Georgiev et al. |
| 2011/0221599 A1 | 9/2011 | Högasten |
| 2011/0221658 A1 | 9/2011 | Haddick et al. |
| 2011/0241234 A1 | 10/2011 | Duparre |
| 2011/0242342 A1 | 10/2011 | Goma et al. |
| 2011/0242355 A1 | 10/2011 | Goma et al. |
| 2011/0242356 A1 | 10/2011 | Aleksic et al. |
| 2011/0255592 A1 | 10/2011 | Sung et al. |
| 2011/0267348 A1 | 11/2011 | Lin et al. |
| 2011/0273531 A1 | 11/2011 | Ito et al. |
| 2011/0274366 A1 | 11/2011 | Tardif |
| 2011/0279721 A1 | 11/2011 | McMahon |
| 2011/0285866 A1 | 11/2011 | Bhrugumalla et al. |
| 2011/0298917 A1 | 12/2011 | Yanagita |
| 2011/0300929 A1 | 12/2011 | Tardif et al. |
| 2011/0310980 A1 | 12/2011 | Mathew |
| 2011/0317766 A1 | 12/2011 | Lim et al. |
| 2012/0012748 A1 | 1/2012 | Pain et al. |
| 2012/0026297 A1 | 2/2012 | Sato |
| 2012/0026342 A1 | 2/2012 | Yu et al. |
| 2012/0039525 A1 | 2/2012 | Tian et al. |
| 2012/0044372 A1 | 2/2012 | Côté et al. |
| 2012/0069235 A1 | 3/2012 | Imai |
| 2012/0113413 A1 | 5/2012 | Miahczylowicz-Wolski et al. |
| 2012/0147139 A1 | 6/2012 | Li et al. |
| 2012/0147205 A1 | 6/2012 | Lelescu et al. |
| 2012/0154551 A1 | 6/2012 | Inoue |
| 2012/0198677 A1 | 8/2012 | Duparre |
| 2012/0200734 A1 | 8/2012 | Tang |
| 2012/0229628 A1 | 9/2012 | Ishiyama et al. |
| 2012/0249550 A1 | 10/2012 | Akeley et al. |
| 2012/0262607 A1 | 10/2012 | Shimura et al. |
| 2012/0287291 A1 | 11/2012 | McMahon et al. |
| 2012/0293695 A1 | 11/2012 | Tanaka |
| 2012/0314033 A1 | 12/2012 | Lee et al. |
| 2012/0327222 A1 | 12/2012 | Ng et al. |
| 2013/0002828 A1 | 1/2013 | Ding et al. |
| 2013/0003184 A1 | 1/2013 | Duparre |
| 2013/0010073 A1* | 1/2013 | Do et al. ......................... 348/46 |

(56) References Cited

U.S. PATENT DOCUMENTS

| | | | |
|---|---|---|---|
| 2013/0022111 A1 | 1/2013 | Chen et al. | |
| 2013/0027580 A1 | 1/2013 | Olsen et al. | |
| 2013/0033579 A1 | 2/2013 | Wajs | |
| 2013/0050504 A1* | 2/2013 | Safaee-Rad et al. | 348/181 |
| 2013/0050526 A1 | 2/2013 | Keelan | |
| 2013/0057710 A1 | 3/2013 | McMahon | |
| 2013/0070060 A1 | 3/2013 | Chatterjee | |
| 2013/0076967 A1 | 3/2013 | Brunner et al. | |
| 2013/0077880 A1 | 3/2013 | Venkataraman et al. | |
| 2013/0077882 A1 | 3/2013 | Venkataraman et al. | |
| 2013/0088637 A1 | 4/2013 | Duparre | |
| 2013/0113899 A1 | 5/2013 | Morohoshi et al. | |
| 2013/0120605 A1 | 5/2013 | Georgiev et al. | |
| 2013/0128068 A1 | 5/2013 | Georgiev et al. | |
| 2013/0128069 A1 | 5/2013 | Georgiev et al. | |
| 2013/0128087 A1 | 5/2013 | Georgiev et al. | |
| 2013/0128121 A1 | 5/2013 | Agarwala et al. | |
| 2013/0147979 A1 | 6/2013 | McMahon et al. | |
| 2013/0215108 A1 | 8/2013 | McMahon et al. | |
| 2013/0222556 A1 | 8/2013 | Shimada | |
| 2013/0229540 A1 | 9/2013 | Farina et al. | |
| 2013/0259317 A1 | 10/2013 | Gaddy | |
| 2013/0265459 A1 | 10/2013 | Duparre et al. | |
| 2014/0009586 A1 | 1/2014 | McNamer et al. | |
| 2014/0132810 A1 | 5/2014 | McMahon | |
| 2014/0198188 A1 | 7/2014 | Izawa | |
| 2014/0218546 A1 | 8/2014 | McMahon | |
| 2014/0232822 A1 | 8/2014 | Venkataraman et al. | |
| 2014/0240528 A1 | 8/2014 | Venkataraman et al. | |
| 2014/0240529 A1 | 8/2014 | Venkataraman et al. | |
| 2014/0253738 A1 | 9/2014 | Mullis | |
| 2014/0267243 A1 | 9/2014 | Venkataraman et al. | |
| 2014/0267286 A1 | 9/2014 | Duparre | |
| 2014/0267633 A1 | 9/2014 | Venkataraman et al. | |
| 2014/0267762 A1 | 9/2014 | Mullis et al. | |
| 2014/0267890 A1 | 9/2014 | Lelescu et al. | |
| 2014/0285675 A1 | 9/2014 | Mullis | |
| 2014/0321712 A1 | 10/2014 | Ciurea et al. | |
| 2015/0042766 A1 | 2/2015 | Ciurea et al. | |
| 2015/0042767 A1 | 2/2015 | Ciurea et al. | |
| 2015/0049915 A1 | 2/2015 | Ciurea et al. | |
| 2015/0049916 A1 | 2/2015 | Ciurea et al. | |
| 2015/0049917 A1 | 2/2015 | Ciurea et al. | |

FOREIGN PATENT DOCUMENTS

| | | | |
|---|---|---|---|
| JP | 2006033493 | A | 2/2006 |
| JP | 2007520107 | A | 7/2007 |
| JP | 2011109484 | A | 6/2011 |
| JP | 2013526801 | A | 6/2013 |
| JP | 2014521117 | A | 8/2014 |
| WO | 2007083579 | A1 | 7/2007 |
| WO | 2008108271 | A1 | 9/2008 |
| WO | 2009151903 | A2 | 12/2009 |
| WO | 2011063347 | A2 | 5/2011 |
| WO | 2011116203 | A1 | 9/2011 |
| WO | 2011063347 | A3 | 10/2011 |
| WO | 2011143501 | A1 | 11/2011 |
| WO | 2012057619 | A1 | 5/2012 |
| WO | 2012057620 | A2 | 5/2012 |
| WO | 2012057621 | A1 | 5/2012 |
| WO | 2012057622 | A1 | 5/2012 |
| WO | 2012057623 | A1 | 5/2012 |
| WO | 2012057620 | A3 | 6/2012 |
| WO | 2012074361 | A1 | 6/2012 |
| WO | 2012078126 | A1 | 6/2012 |
| WO | 2012082904 | A1 | 6/2012 |
| WO | 2012155119 | A1 | 11/2012 |
| WO | 2013003276 | A1 | 1/2013 |
| WO | 2013043751 | A1 | 3/2013 |
| WO | 2013043761 | A1 | 3/2013 |
| WO | 2013049699 | A1 | 4/2013 |
| WO | 2013055960 | A1 | 4/2013 |
| WO | 2013119706 | A1 | 8/2013 |
| WO | 2013126578 | A1 | 8/2013 |
| WO | 2014052974 | A2 | 4/2014 |
| WO | 2014032020 | A3 | 5/2014 |
| WO | 2014078443 | A1 | 5/2014 |
| WO | 2014130849 | A1 | 8/2014 |
| WO | 2014133974 | A1 | 9/2014 |
| WO | 2014138695 | A1 | 9/2014 |
| WO | 2014138697 | A1 | 9/2014 |
| WO | 2014144157 | A1 | 9/2014 |
| WO | 2014145856 | A1 | 9/2014 |
| WO | 2014149403 | A1 | 9/2014 |
| WO | 2014150856 | A1 | 9/2014 |
| WO | 2014159721 | A1 | 10/2014 |
| WO | 2014159779 | A1 | 10/2014 |
| WO | 2014160142 | A1 | 10/2014 |
| WO | 2014164550 | A2 | 10/2014 |
| WO | 2014164909 | A1 | 10/2014 |
| WO | 2014165244 | A1 | 10/2014 |

OTHER PUBLICATIONS

Chan et al., "Investigation of Computational Compound-Eye Imaging System with Super-Resolution Reconstruction", IEEE, ISASSP 2006, pp. 1177-1180.

Chan et al., "Super-resolution reconstruction in a computational compound-eye imaging system", Multidim Syst Sign Process, 2007, vol. 18, pp. 83-101.

Chen et al., "Interactive deformation of light fields", In Proceedings of Siggraph I3D 2005, pp. 139-146.

Drouin et al., "Fast Multiple-Baseline Stereo with Occlusion", Proceedings of the Fifth International Conference on 3-D Digital Imaging and Modeling, 2005, 8 pgs.

Drouin et al., "Geo-Consistency for Wide Multi-Camera Stereo", Proceedings of the 2005 IEEE Computer Society Conference on Computer Vision and Pattern Recognition, 2005, 8 pgs.

Drouin et al., "Improving Border Localization of Multi-Baseline Stereo Using Border-Cut", International Journal of Computer Vision, Jul. 2009, vol. 83, Issue 3, 8 pgs.

Duparre et al., "Artificial apposition compound eye fabricated by micro-optics technology", Applied Optics, Aug. 1, 2004, vol. 43, No. 22, pp. 4303-4310.

Duparre et al., "Artificial compound eye zoom camera", Bioinspiration & Biomimetics, 2008, vol. 3, pp. 1-6.

Duparre et al., "Artificial compound eyes—different concepts and their application to ultra flat image acquisition sensors", MOEMS and Miniaturized Systems IV, Proc. SPIE 5346, Jan. 2004, pp. 89-100.

Duparre et al., "Chirped arrays of refractive ellipsoidal microlenses for aberration correction under oblique incidence", Optics Express, Dec. 26, 2005, vol. 13, No. 26, pp. 10539-10551.

Duparre et al., "Micro-optical artificial compound eyes", Bioinspiration & Biomimetics, 2006, vol. 1, pp. R1-R16.

Duparre et al., "Microoptical artificial compound eyes—from design to experimental verification of two different concepts", Proc. of SPIE, Optical Design and Engineering II, vol. 5962, pp. 59622A-1-59622A-12.

Duparre et al., "Microoptical Artificial Compound Eye—Two Different Concepts for Compact Imaging Systems", 11th Microoptics Conference, Oct.30-Nov. 2, 2005, 2 pgs.

Duparre et al., "Microoptical telescope compound eye", Optics Express, Feb. 7, 2005, vol. 13, No. 3, pp. 889-903.

Duparre et al., "Micro-optically fabricated artificial apposition compound eye", Electronic Imaging—Science and Technology, Prod. SPIE 5301, Jan. 2004, pp. 25-33.

Duparre et al., "Novel Optics/Micro-Optics for Miniature Imaging Systems", Proc. of SPIE, 2006, vol. 6196, pp. 619607-1-619607-15.

Duparre et al., "Theoretical analysis of an artificial superposition compound eye for application in ultra flat digital image acquisition devices", Optical Systems Design, Proc. SPIE 5249, Sep. 2003, pp. 408-418.

Duparre et al., "Thin compound-eye camera", Applied Optics, May 20, 3005, vol. 44, No. 15, pp. 2949-2956.

(56) References Cited

OTHER PUBLICATIONS

Duparre et al., "Ultra-Thin Camera Based on Artificial Apposistion Compound Eyes", 10th Microoptics Conference, Sep. 1-3, 2004, 2 pgs.
Fanaswala, "Regularized Super-Resolution of Multi-View Images", Retrieved on Nov. 10, 2012. Retrieved from the Internet at URL:<http://www.site.uottawa.ca/-edubois/theses/Fanaswala_thesis.pdf>, 163 pgs.
Farrell et al., "Resolution and Light Sensitivity Tradeoff with Pixel Size", Proceedings of the SPIE Electronic Imaging 2006 Conference, 2006, vol. 6069, 8 pgs.
Farsiu et al., "Advances and Challenges in Super-Resolution", International Journal of Imaging Systems and Technology, 2004, vol. 14, pp. 47-57.
Farsiu et al., "Fast and Robust Multiframe Super Resolution", IEEE Transactions on Image Processing, Oct. 2004, vol. 13, No. 10, pp. 1327-1344.
Farsiu et al., "Multiframe Demosaicing and Super-Resolution of Color Images", IEEE Transactions on Image Processing, Jan. 2006, vol. 15, No. 1, pp. 141-159.
Feris et al., "Multi-Flash Stereopsis: Depth Edge Preserving Stereo with Small Baseline Illumination", IEEE Trans on PAMI, 2006, 31 pgs.
Fife et al., "A 3D Multi-Aperture Image Sensor Architecture", Custom Integrated Circuits Conference, 2006, CICC '06, IEEE, pp. 281-284.
Fife et al., "A 3MPixel Multi-Aperture Image Sensor with 0.7Mu Pixels in.0.11Mu CMOS", ISSCC 2008, Session 2, Image Sensors & Technology, 2008, pp. 48-50.
Fischer et al., Optical System Design, 2nd Edition, SPIE Press, pp. 191-198.
Fischer, et al., "Optical System Design, 2nd Edition, SPIE Press, pp. 49-58".
Goldman et al., "Video Object Annotation, Navigation, and Composition", In Proceedings of UIST 2008, pp. 3-12.
Gortler et al., "The Lumigraph", In Proceedings of SIGGRAPH 1996, pp. 43-54.
Hacohen et al., "Non-Rigid Dense Correspondence with Applications for Image Enhancement", ACM Transactions on Graphics, 30, 4, 2011, pp. 70:1-70:10.
Hamilton, "JPEG File Interchange Format, Version 1.02", Sep. 1, 1992, 9 pgs.
Hardie, "A Fast Image Super-Algorithm Using an Adaptive Wiener Filter", IEEE Transactions on Image Processing, Dec. 2007, vol. 16, No. 12, pp. 2953-2964.
Hasinoff et al., "Search-and-Replace Editing for Personal Photo Collections", Computational Photography (ICCP) 2010, pp. 1-8.
Horisaki et al., "Irregular Lens Arrangement Design to Improve Imaging Performance of Compound-Eye Imaging Systems", Applied Physics Express, 2010, vol. 3, pp. 022501-1-022501-3.
Horisaki et al., "Superposition Imaging for Three-Dimensionally Space-Invariant Point Spread Functions", Applied Physics Express, 2011, vol. 4, pp. 112501-1-112501-3.
Horn et al., "LightShop: Interactive Light Field Manipulation and Rendering", In Proceedings of I3D 2007, pp. 121-128.
Isaksen et al., "Dynamically Reparameterized Light Fields", In Proceedings of SIGGRAPH 2000, pp. 297-306.
Jarabo et al., "Efficient Propagation of Light Field Edits", In Proceedings of SIACG 2011, pp. 75-80.
Joshi et al., "Synthetic Aperture Tracking: Tracking Through Occlusions", ICCV IEEE 11th International Conference on Computer Vision; Publication.[online]. Oct. 2007 [retrieved Jul. 28, 2014]. Retrieved from the Internet: http:I/ieeexplore.ieee.org/stamp/stamp.jsp?tp=&arnumber=4409032&isnumber=4408819>; pp. 1-8.
Kang et al., "Handling Occlusions inn Dense Multi-View Stereo", Computer Vision and Pattern Recognition, 2001, vol. 1, pp. 1-103-1-110.
Kitamura et al., "Reconstruction of a high-resolution image on a compound-eye image-capturing system", Applied Optics, Mar. 10, 2004, vol. 43, No. 8, pp. 1719-1727.
Krishnamurthy et al., "Compression and Transmission of Depth Maps for Image-Based Rendering", Image Processing, 2001, pp. 828-831.
Kutulakos et al., "Occluding Contour Detection Using Affine Invariants and Purposive Viewpoint Control", Proc., CVPR 94, 8 pgs.
Lensvector, "How LensVector Autofocus Works", printed Nov. 2, 2012 from http://www.lensvector.com/overview.html, 1 pg.
Levoy, "Light Fields and Computational Imaging", IEEE Computer Society, Aug. 2006, pp. 46-55.
Levoy et al., "Light Field Rendering", Proc. ADM SIGGRAPH '96, pp. 1-12.
Li et al., "A Hybrid Camera for Motion Deblurring and Depth Map Super-Resolution," Jun. 23-28, 2008, IEEE Conference on Computer Vision and Pattern Recognition, 8 pgs. Retrieved from vvww.eecis.udel.edu/~jye/lab_research/08/deblur-feng.pdf on Feb. 5, 2014.
Liu et al., "Virtual View Reconstruction Using Temporal Information", 2012 IEEE International Conference on Multimedia and Expo, 2012, pp. 115-120.
Lo et al., "Stereoscopic 3D Copy & Paste", ACM Transactions on Graphics, vol. 29, No. 6, Article 147, Dec. 2010, pp. 147:1-147:10.
Muehlebach, "Camera Auto Exposure Control for VSLAM Applications", Studies on Mechatronics, Swiss Federal Institute of Technology Zurich, Autumn Term 2010 course, 67 pgs.
Nayar, "Computational Cameras: Redefining the Image", IEEE Computer Society, Aug. 2006, pp. 30-38.
Ng, "Digital Light Field Photography", Thesis, Jul. 2006, 203 pgs.
Ng et al., "Super-Resolution Image Restoration from Blurred Low-Resolution Images", Journal of Mathematical Imaging and Vision, 2005, vol. 23, pp. 367-378.
Nitta et al., "Image reconstruction for thin observation module by bound optics by using the iterative backprojection method", Applied Optics, May 1, 2006, vol. 45, No. 13, pp. 2893-2900.
Nomura et al., "Scene Collages and Flexible Camera Arrays", Proceedings of Eurographics Symposium on Rendering, 2007, 12 pgs.
Park et al., "Super-Resolution Image Reconstruction", IEEE Signal Processing Magazine, May 2003, pp. 21-36.
Pham et al., "Robust Super-Resolution without Regularization", Journal of Physics: Conference Series 124, 2008, pp. 1-19.
Polight, "Designing Imaging Products Using Reflowable Autofocus Lenses", http://www.polight.no/tunable-polymer-autofocus-lens-html--11.html.
Protter et al., "Generalizing the Nonlocal-Means to Super-Resolution Reconstruction", IEEE Transactions on Image Processing, Jan. 2009, vol. 18, No. 1, pp. 36-51.
Radtke et al., "Laser lithographic fabrication and characterization of a spherical artificial compound eye", Optics Express, Mar. 19, 2007, vol. 15, No. 6, pp. 3067-3077.
Rander et al., "Virtualized Reality: Constructing Time-Varying Virtual Worlds From Real World Events", Proc. of IEEE Visualization '97, Phoenix, Arizona, Oct. 19-24, 1997, pp. 277-283, 552.
Rhemann et al, "Fast Cost-Volume Filtering for Visual Correspondence and Beyond", IEEE Trans. Pattern Anal. Mach. Intell, 2013, vol. 35, No. 2, pp. 504-511.
Robertson et al., "Dynamic Range Improvement Through Multiple. Exposures", In Proc. of the Int. Conf. on Image Processing, 1999, 5 pgs.
Robertson et al., "Estimation-theoretic approach to dynamic range enhancement using multiple exposures", Journal of Electronic Imaging, Apr. 2003, vol. 12, No. 2, pp. 219-228.
Roy et al., "Non-Uniform Hierarchical Pyramid Stereo for Large Images", Computer and Robot Vision, 2007, pp. 208-215.
Sauer et al., "Parallel Computation of Sequential Pixel Updates in Statistical Tomographic Reconstruction", ICIP 1995, pp. 93-96.
Seitz et al., "Plenoptic Image Editing", International Journal of Computer Vision 48, 2, pp. 115-129.
Shum et al., "Pop-Up Light Field: An Interactive Image-Based Modeling and Rendering System," Apr. 2004, ACM Transactions on Graphics, vol. 23, No. 2, pp. 143-162. Retrieved from http://131.107.65.14/en-us/um/people/jiansun/papers/PopupLightField_TOG.pdf on Feb. 5.

(56) References Cited

OTHER PUBLICATIONS

Stollberg et al., "The Gabor superlens as an alternative wafer-level camera approach inspired by superposition compound eyes of nocturnal insects", Optics Express, Aug. 31, 2009, vol. 17, No. 18, pp. 15747-15759.
Sun et al., "Image Super-Resolution Using Gradient Profile Prior", Source and date unknown, 8 pgs.
Takeda et al., "Super-resolution Without Explicit Subpixel Motion Estimation", IEEE Transaction on Image Processing, Sep. 2009, vol. 18, No. 9, pp. 1958-1975.
Tanida et al., "Color imaging with an integrated compound imaging system", Optics Express, Sep. 8, 2003, vol. 11, No. 18, pp. 2109-2117.
Tanida et al., "Thin observation module by bound optics (TOMBO): concept and experimental verification", Applied Optics, Apr. 10, 2001, vol. 40, No. 11, pp. 1806-1813.
Taylor, "Virtual camera movement: The way of the future?", American Cinematographer 77, (Sep. 9), 93-100.
Vaish et al., "Reconstructing Occluded Surfaces Using Synthetic Apertures: Stereo, Focus and Robust Measures", Proceeding, CVPR '06 Proceedings of the 2006 IEEE Computer Society Conference on Computer Vision and Pattern Recognition—vol. 2, pp. 2331-2338.
Vaish et al., "Synthetic Aperture Focusing Using a Shear-Warp Factorization of the Viewing Transform", IEEE Workshop on A3DISS, CVPR, 2005, 8 pgs.
Vaish et al., "Using Plane + Parallax for Calibrating Dense Camera Arrays", IEEE Conference on Computer Vision and Pattern Recognition (CVPR), 2004, 8 pgs.
Veilleux, "CCD Gain Lab: The Theory", University of Maryland, College Park—Observational Astronomy (ASTR 310), Oct. 19, 2006, pp. 1-5 (online),[retrieved on May 13, 2014]. Retrieved from the Internet <URL:.http://www.astro.umd.edu/~veilleux/ASTR310/fall06/ccd_theory.pdf, 5 pgs.
Vuong et al., "A New Auto Exposure and Auto White-Balance Algorithm to Detect High Dynamic Range Conditions Using CMOS Technology", Proceedings of the World Congress on Engineering and Computer Science 2008, WCECS 2008, Oct. 22-24, 2008.
Wang, "Calculation of Image Position, Size and Orientation Using First Order Properties", 10 pgs.
Wetzstein et al., "Computational Plenoptic Imaging", Computer Graphics Forum, 2011, vol. 30, No. 8, pp. 2397-2426.
Wheeler et al., "Super-Resolution Image Synthesis Using Projections Onto Convex Sets in the Frequency Domain", Proc. SPIE, 2005, 5674, 12 pgs.
Wikipedia, "Polarizing Filter (Photography)", http://en.wikipedia.org/wiki/Polarizing_filter_(photography), 1 pg.
Wilburn, "High Performance Imaging Using Arrays of Inexpensive Cameras", Thesis of Bennett Wilburn, Dec. 2004, 128 pgs.
Wilburn et al., "High Performance Imaging Using Large Camera Arrays", ACM Transactions on Graphics, Jul. 2005, vol. 24, No. 3, pp. 765-776.
Wilburn et al., "High-Speed Videography Using a Dense Camera Array", Proceeding, CVPR'04 Proceedings of the 2004 IEEE Computer Society Conference on Computer Vision and Pattern Recognition, pp. 294-301.
Wilburn et al., "The Light Field Video Camera", Proceedings of Media Processors 2002, SPIE Electronic Imaging, 2002, 8 pgs.
Wippermann et al., "Design and fabrication of a chirped array of refractive ellipsoidal micro-lenses for an apposition eye camera objective", Proceedings of SPIE, Optical Design and Engineering II, Oct. 15, 2005, 59622C-1-59622C-11.
Yang et al., "A Real-Time Distributed Light Field Camera", Eurographics Workshop on Rendering (2002), pp. 1-10.
Yang et al., "Superresolution Using Preconditioned Conjugate Gradient Method", Source and date unknown, 8 pgs.
Zhang et al., "A Self-Reconfigurable Camera Array", Eurographics Symposium on Rendering, 2004, 12 pgs.
Zomet et al., "Robust Super-Resolution", IEEE, 2001, pp. 1-6.

International Preliminary Report on Patentability for International Application No. PCT/US2012/059813, Search Completed Apr. 15, 2014, 7 pgs.
International Preliminary Report on Patentability for International Application PCT/US2013/027146, Report Completed Apr. 2, 2013, 10 pages.
International Preliminary Report on Patentability for International Application PCT/US2013/046002, Report completed Dec. 31, 2014, Mailed Jan. 8, 2015, 6 Pgs.
International Preliminary Report on Patentability for International Application PCT/US2013/048772, Report completed Dec. 31, 2014, Mailed Jan. 8, 2015, 8 Pgs.
International Search Report and Written Opinion for International Application No. PCT/US13/46002, Search completed Nov. 13, 2013, Mailed Nov. 29, 2013, 7 pgs.
International Search Report and Written Opinion for International Application No. PCT/US13/56065, Search Completed Nov. 25, 2013, Mailed Nov. 26, 2013, 8 pgs.
International Search Report and Written Opinion for International Application No. PCT/US13/59991, Search Completed Feb. 6, 2014, Mailed Feb. 26, 2014, 8 pgs.
International Search Report and Written Opinion for International Application No. PCT/US2011/64921, Report Completed Feb. 25, 2011, mailed Mar. 6, 2012, 17 pgs.
International Search Report and Written Opinion for International Application No. PCT/US2013/024987, Search Completed Mar. 27, 2013, Mailed Apr. 15, 2013, 14 pgs.
International Search Report and Written Opinion for International Application No. PCT/US2013/027146, completed Apr. 2, 2013, 12 pgs.
International Search Report and Written Opinion for International Application No. PCT/US2013/048772, Search Completed Oct. 21, 2013, Mailed Nov 8, 2013, 6 pgs.
International Search Report and Written Opinion for International Application No. PCT/US2013/056502, Search Completed Feb. 18, 2014, Mailed Mar. 19, 2014, 7 pgs.
International Search Report and Written Opinion for International Application No. PCT/US2013/069932, Search Completed Mar. 14, 2014, Mailed Apr. 14, 2014, 12 pgs.
International Search Report and Written Opinion for International Application PCT/US11/36349, mailed Aug. 22, 2011, 11 pgs.
International Search Report and Written Opinion for International Application PCT/US13/62720, completed Mar. 25, 2014, Mailed Apr. 21, 2014, 9 Pgs.
International Search Report and Written Opinion for International Application PCT/US14/024903, completed Jun. 12, 2014, Mailed, Jun. 27, 2014, 13 pgs.
International Search Report and Written Opinion for International Application PCT/US14/17766, report completed May 28, 2014, 9 Pgs.
International Search Report and Written Opinion for International Application PCT/US14/18084, completed May 23, 2014, Mailed Jun. 10, 2014, 12 pgs.
International Search Report and Written Opinion for International Application PCT/US14/18116, completed May 13, 2014, Mailed Jun. 2, 2014, 12 Pgs.
International Search Report and Written Opinion for International Application PCT/US14/22118, completed Jun. 9, 2014, Mailed, Jun. 25, 2014, 5 pgs.
International Search Report and Written Opinion for International Application PCT/US14/22774 report completed Jun. 9, 2014, Mailed Jul. 14, 2014, 6 Pgs.
International Search Report and Written Opinion for International Application PCT/US14/24407, report completed Jun. 11, 2014, Mailed Jul. 8, 2014, 9 Pgs.
International Search Report and Written Opinion for International Application PCT/US14/25100, report completed Jul. 7, 2014, Mailed Aug. 7, 2014 5 Pgs.
International Search Report and Written Opinion for International Application PCT/US14/25904 report completed Jun. 10, 2014, Mailed Jul. 10, 2014, 6 Pgs.
International Search Report and Written Opinion for International Application PCT/US2009/044687, completed Jan. 5, 2010, 9 pgs.

(56) References Cited

OTHER PUBLICATIONS

International Search Report and Written Opinion for International Application PCT/US2010/057661, completed Mar. 9, 2011, 14 pgs.
International Search Report and Written Opinion for International Application PCT/US2012/044014, completed Oct. 12, 2012, 15 pgs.
International Search Report and Written Opinion for International Application PCT/US2012/056151, completed Nov. 14, 2012, 10 pgs.
International Search Report and Written Opinion for International Application PCT/US2012/059813, Report completed Dec. 17, 2012, 8 pgs.
International Search Report and Written Opinion for International Application PCT/US2012/37670, Mailed Jul. 18, 2012, Report Completed Jul. 5, 2012, 9 pgs.
International Search Report and Written Opinion for International Application PCT/US2012/58093, Report completed Nov. 15, 2012, 12 pgs.
International Search Report and Written Opinion for International Application PCT/US2014/022123, report completed Jun. 9, 2014, Mailed Jun. 25, 2014, 5 pgs.
International Search Report and Written Opinion for International Application PCT/US2014/024947, Report Completed Jul. 8, 2014, Mailed Aug 5, 2014, 8 Pgs.
International Search Report and Written Opinion for International Application PCT/US2014/028447, report completed Jun. 30, 2014, Mailed Jul. 21, 2014, 8 Pgs.
International Search Report and Written Opinion for International Application PCT/US2014/030692, report completed Jul. 28, 2014, Mailed Aug 27, 2014, 7 Pages.
International Search Report and Written Opinion for International Application PCT/US2014/23762, Report Completed May 30, 2014, Mailed Jul. 3, 2014, 6 Pgs.
Office Action for U.S. Appl. No. 12/952,106, dated Aug. 16, 2012, 12 pgs.
Baker et al., "Limits on Super-Resolution and How to Break Them", IEEE Transactions on Pattern Analysis and Machine Intelligence, Sep. 2002, vol. 24, No. 9, pp. 1167-1183.
Bertero et al., "Super-resolution in computational imaging", Micron, 2003, vol. 34, Issues 6-7, 17 pgs.
Bishop et al., "Full-Resolution Depth Map Estimation from an Aliased Plenoptic Light Field", ACCV 2010, Part II, LNCS 6493, pp. 186-200.
Bishop et al., "Light Field Superresolution", Retrieved from http://home.eps.hw.ac.uk/~sz73/ICCP09/LightFieldSuperresolution.pdf, 9 pgs.
Bishop et al., "The Light Field Camera: Extended Depth of Field, Aliasing, and Superresolution", IEEE Transactions on Pattern Analysis and Machine Intelligence, May 2012, vol. 34, No. 5, pp. 972-986.
Borman, "Topics in Multiframe Superresolution Restoration", Thesis of Sean Borman, Apr. 2004, 282 pgs.
Borman et al, "Image Sequence Processing", Source unknown, Oct. 14, 2002, 81 pgs.
Borman et al., "Block-Matching Sub-Pixel Motion Estimation from Noisy, Under-Sampled Frames—An Empirical Performance Evaluation", Proc SPIE, Dec. 1998, 3653, 10 pgs.
Borman et al., "Image Resampling and Constraint Formulation for Multi-Frame Super-Resolution Restoration", Proc. SPIE, Jun. 2003, 5016, 12 pgs.
Borman et al., "Linear models for multi-frame super-resolution restoration under non-affine registration and spatially varying PSF", Proc. SPIE, May 2004, vol. 5299, 12 pgs.
Borman et al., "Nonlinear Prediction Methods for Estimation of Clique Weighting Parameters in NonGaussian Image Models", Proc. SPIE, 1998. 3459, 9 pgs.
Borman et al., "Simultaneous Multi-Frame Map Super-Resolution Video Enhancement Using Spatio-Temporal Priors", Image Processing, 1999, ICIP 99 Proceedings, vol. 3, pp. 469-473.
Borman et al., "Super-Resolution from Image Sequences—A Review", Circuits & Systems, 1998, pp. 374-378.
Bose et al., "Superresolution and Noise Filtering Using Moving Least Squares", IEEE Transactions on Image Processing, date unknown, 21 pgs.
Boye et al., "Comparison of Subpixel Image Registration Algorithms", Proc. of SPIE-IS&T Electronic Imaging, vol. 7246, pp. 72460X-1-72460X-9.
Bruckner et al., "Artificial compound eye applying hyperacuity", Optics Express, Dec. 11, 2006, vol. 14, No. 25, pp. 12076-12084.
Bruckner et al., "Driving microoptical imaging systems towards miniature camera applications", Proc. SPIE, Micro-Optics, 2010, 11 pgs.
Bruckner et al., "Thin wafer-level camera lenses inspired by insect compound eyes", Optics Express, Nov. 22, 2010, vol. 18, No. 24, pp. 24379-24394.
Capel, "Image Mosaicing and Super-resolution", [online], Retrieved on Nov. 10, 2012. Retrieved from the Internet at URL:<http://citeseerx.ist.psu.edu/viewdoc/download?doi=1 0.1.1.226.2643 &rep=rep1 &type=pdf>, Title pg., abstract, table of contents, pp. 1-263 (269 total pages).

* cited by examiner

SYSTEM AND METHODS FOR CALIBRATION OF AN ARRAY CAMERA

CROSS-REFERENCE TO RELATED APPLICATION

This application is a continuation of U.S. patent application Ser. No. 13/792,143, entitled "System and Methods for Calibration of an Array Camera", filed on Mar. 10, 2013, the disclosure of which is incorporated by reference herein in its entirety.

FIELD OF THE INVENTION

The present invention relates to calibration of an array camera. More particularly, this invention relates to systems and methods for calibrating each imaging component in an array camera.

BACKGROUND

An array camera is a camera that is made up of multiple imaging components. Each individual imaging component captures data for a two dimensional image of a view. For purposes of this discussion, an imaging component is an individual camera and/or circuitry including an array of pixels that capture data for a two dimensional image of the view. The data of the two-dimensional images used to generate as a light field. A light field can be used to produce super-resolution (SR) images and other types of images of the view using some or all of the data from the various two dimensional images captured by the individual imaging components.

During the manufacture of most digital cameras (including array cameras) and each imaging component of an array camera, a calibration process is typically performed. In a conventional camera or imaging component, the calibration process typically measures the Modulation Transfer Function (MTF). MTF measurements enable the detection of aberrations that degrade MTF. Some calibration processes may also be used to collect data that characterizes the camera or imaging component in order to adjust the parameters of various image processing algorithms to produce desired images. Typically, the need to obtain precise data during calibration is balanced with the need to keep the manufacturing test overhead to a minimum.

SUMMARY OF THE INVENTION

Systems and methods in accordance with embodiments of this invention enable calibration of array cameras. In accordance with embodiments of this invention, one or more of the imaging components of the array camera are designated as a reference imaging component and each of the remaining imaging components in the array camera is an associate imaging component. Each of the associate imaging components is associated with at least one of the reference imaging components.

In some embodiments in accordance with this invention, the calibration process is performed in the following manner. An image of a test pattern is captured by each of the imaging components of the array camera. Scene independent geometric corrections for the image data captured by the reference imaging component is generated using data of the image of the test pattern captured by the reference component and data describing the test pattern using a processor. A corrected image of the test pattern for the reference component is generated based on the scene independent geometric corrections for the image data captured by the reference imaging component and the image of the test pattern captured by the reference imaging component using the processor. Scene independent geometric corrections for the image data captured by each of the associate imaging components associated with the reference imaging component using the data of image of the test pattern captured by each associate imaging component and the corrected image of the reference component using the processor.

In some embodiments in accordance with the invention, the test pattern includes a low-contrast slanted edge pattern. In accordance with some of these embodiments, the test pattern includes a plurality of Macbeth Color Chart type patterns inset at different positions in the low-contrast slanted pattern.

In accordance with some embodiments, the test pattern is at a distance of at least 70 percent of the hyperfocal distance of the array camera away from the array camera during the capturing of the image of the test pattern. In accordance with other embodiments, the test pattern is at a distance of at 50 percent of the hyperfocal distance of the array camera away from the array camera during the capturing of the image of the test pattern. In some embodiments in accordance with this invention, at least one pass/fail test of the array camera is performed based on images of the test pattern captured by the plurality of imaging components in the array camera.

In some embodiments in accordance with this invention, the generating of scene independent geometric corrections for the image data captured by the reference imaging component using data of the image of the test pattern captured by the reference component and data describing the test pattern is performed in the following manner. The intersection points in the image of the test pattern captured by the reference imaging component are identified. Uniformity characteristics of the reference imaging component are determined from the identified intersection points in the image of the test pattern captured by the reference imaging component and the test pattern. A set of geometric corrections for the reference imaging component is derived to compensate for low frequency aberrations in the captured image of the test pattern.

In some embodiments, the generating of scene independent geometric corrections for the image data captured by each of the associate imaging components associated with the reference imaging component is performed in the following manner. The intersection points in the test pattern image captured by each of the associate imaging components are identified. The intersection points from the captured test pattern images captured by each of the associate imaging components associated with the reference component are translated in accordance with an expected parallax shift for each of the associate imaging components relative to the reference component. A set of geometric corrections for each of the associate imaging components associated with the reference component to compensate for low frequency aberrations in the captured image of the test pattern by comparing the translated intersections points in the images captured by each of the associate imaging components to corresponding intersection points in the corrected image for the reference component. In some of these embodiments, the expected parallax shift for each of the associate imaging components is based upon at least one of the physical offset of a particular imaging component to the reference imaging component, the behavior of sensor optics in the particular associate imaging component, and distance of the test pattern from the array camera.

In some embodiments, the images captured by the imaging components are stored in order to perform the calibration of the reference component and each of the plurality of associate imaging components at a later time.

In some embodiments, the scene dependent geometric correction information for the image data captured by the reference component is stored in a memory. In some embodiment, the scene dependent geometric correction information for the image data captured by each of the associated imaging components associated with the reference component is stored in a memory.

In accordance with some embodiments, the calibration process further includes generating colorimetric corrections for the image data captured by each imaging component in the array camera using data of the image of the test pattern captured by the each imaging component. In some embodiments, the calibration process further includes generating photometric corrections for the image data captured by each imaging component in the array camera using data of the image of the test pattern captured by the reference component using the processor.

DETAILED DESCRIPTION

Figure 1:
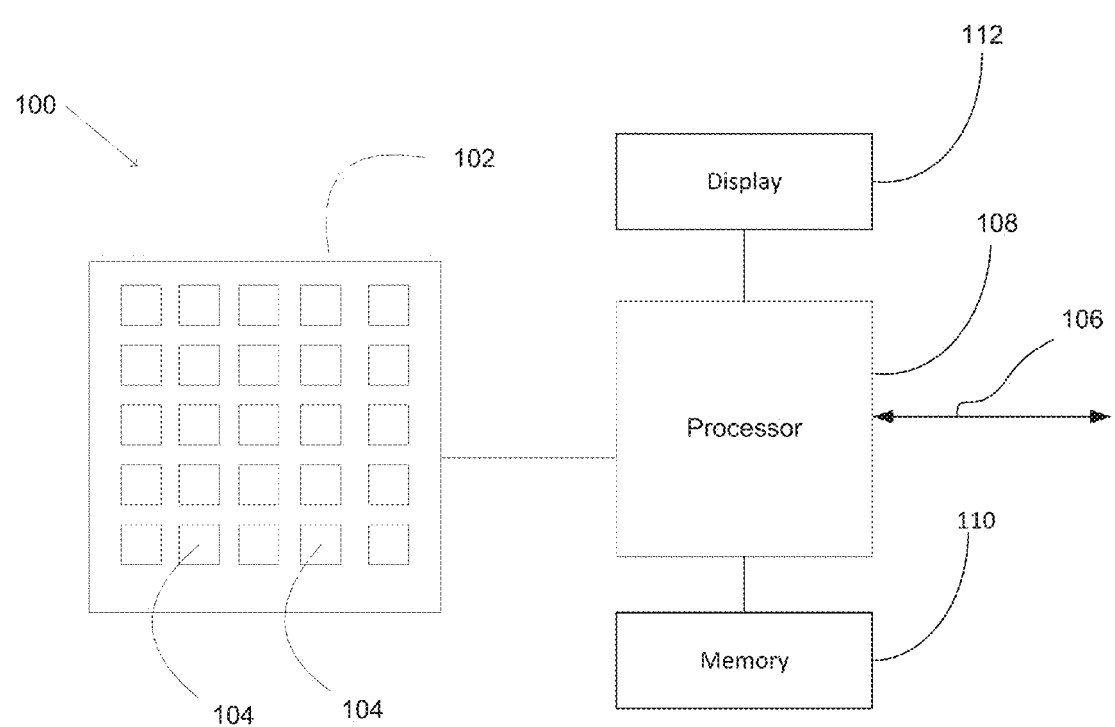
FIG. 1 conceptually illustrates an array camera in accordance with an embodiment of this invention.

Turning now to the drawings, systems and methods for performing a calibration process for an array camera in accordance with embodiments of the invention are illustrated. In accordance with many embodiments of the invention, at least one of the imaging components in the array camera is designated as a "master" or "reference" imaging component; and each of the remaining imaging components in the array is an associate imaging component. Each associate imaging component is associated with at least one of the reference imaging components. In several embodiments, a calibration process is performed to determine relevant characteristics of each reference imaging component including (but not limited to) colorimetric and photometric calibration processes, and/or determining scene independent geometric corrections that can be applied to the image data captured by the imaging component to account for distortions related to the mechanical construction of the imaging component. The process then determines relevant characteristics of each of the associate imaging components that are associated with a particular reference component. In a number of embodiments, the characteristics of the associate imaging components are determined with respect to the corresponding characteristics of the associated reference imaging component. In several embodiments, scene independent geometric corrections for the image data captured by an associate imaging component are determined by adjusting the image data captured by the associate image component for parallax and then comparing the parallax adjusted image data to a corrected image, where the corrected image is generated by applying the appropriate scene independent geometric corrections to the image data captured by the reference imaging component (i.e. the scene independent geometric corrections for the image data of the reference imaging component determined during the calibration of the reference imaging component). Systems and methods for calibrating array cameras in accordance with embodiments of the invention are discussed further below.

Capturing Light Field Image Data

A light field, which is often defined as a 4D function characterizing the light from all direction at all points in a scene, can be interpreted as a two-dimensional (2D) collection of data from 2D images of a scene. Array cameras, such as those described in U.S. patent application Ser. No. 12/935,504 entitled "Capturing and Processing of Images using Monolithic Array camera with Heterogeneous Imagers" to Venkataraman et al., can be utilized to capture light field images. In a number of embodiments, super resolution processes such as those described in U.S. patent application Ser. No. 12/967,807 entitled "Systems and Methods for Synthesizing High Resolution Images Using Super-Resolution Processes" to Lelescu et al., are utilized to synthesize a higher resolution 2D image or a stereo pair of higher resolution 2D images from the lower resolution image data in the light field captured by the imaging components in an array camera. The terms high or higher resolution and low or lower resolution are used here in a relative sense and not to indicate the specific resolutions of the images captured by the array camera. The super resolution processing techniques described in U.S. patent application Ser. No. 12/967,807 can utilize a variety of calibration information including scene independent geometric corrections related to the distortions introduced by the construction of the imaging components utilized to capture the lower resolution image data. Scene independent distortions introduced by the imaging components of an array camera can limit the fidelity of a higher resolution image generated by super resolution imaging due to uncertainty concerning the relevant location within the scene of a piece of image data. By measuring the distortions during calibration, the uncertainty introduced by the distortions can be reduced, improving the performance of the super resolution process. In a similar manner, colorimetric and photometric variation between similar imaging components in a array camera can complicate image processing by increasing the difficulty of identifying similar points within a scene in the image data captured by the imaging components. The disclosures of U.S. patent application Ser. No. 12/935,504 and U.S. patent application Ser. No. 12/967,807 are hereby incorporated by reference in their entirety.

Each two-dimensional (2D) image in a captured light field is from the viewpoint of one of the imaging components in the array camera. A high resolution image synthesized using super resolution processing is synthesized from a specific viewpoint that can be referred to as a reference viewpoint. The reference viewpoint can be from the viewpoint of one of the imaging components in an array camera. Alternatively, the reference viewpoint can be an arbitrary virtual viewpoint.

Due to the different viewpoint of each of the imaging components, parallax results in variations in the position of foreground objects within the captured images of the scene. Processes for performing parallax detection are discussed in U.S. Provisional Patent Application Ser. No. 61/691,666 entitled "Systems and Methods for Parallax Detection and Correction in Images Captured Using Array Cameras" to Venkataraman et al., the disclosure of which is incorporated by reference herein in its entirety. As is disclosed in U.S. Provisional Patent Application Ser. No. 61/691,666, a depth map from a reference viewpoint can be generated by determining the disparity between the pixels in the images within a light field due to parallax. A depth map indicates the distance of the surfaces of scene objects from a reference viewpoint. In a number of embodiments, the computational complexity of generating depth maps is reduced by generating an initial low resolution depth map and then increasing the resolution of the depth map in regions where additional depth information is desirable such as (but not limited to) regions involving depth transitions and/or regions containing pixels that are occluded in one or more images within the light field.

During super resolution processing, a depth map can be utilized in a variety of ways. U.S. patent application Ser. No. 12/967,807 describes how a depth map can be utilized during super resolution processing to dynamically refocus a synthesized image to blur the synthesized image to make portions of the scene that do not lie on the focal plane to appear out of focus. U.S. patent application Ser. No. 12/967,807 also describes how a depth map can be utilized during super resolution processing to generate a stereo pair of higher resolution images for use in 3D applications. A depth map can also be utilized to synthesize a high resolution image from one or more virtual viewpoints. In this way, a rendering device can simulate motion parallax and dolly zoom. In addition to utilizing a depth map during super-resolution processing, a depth map can be utilized in a variety of post processing processes to achieve effects including (but not limited to) dynamic refocusing, generation of stereo pairs, and generation of virtual viewpoints without performing super-resolution processing.

Array Camera Architecture

Array cameras in accordance with embodiments of the invention are configured so that the array camera software can control the capture of light field image data and can capture the light field image data into a file that can be used to render one or more images on any of a variety of appropriately configured rendering devices. An array camera including an array of imaging components in accordance with an embodiment of the invention is illustrated in FIG. 1. The array camera 100 includes an array camera module 102, a processor 108, a memory 110 and a display 112. The array camera module 102 includes an array of imaging components 104 formed by a sensor and a lens stack array and the array camera module 102 is configured to communicate with a processor 108. The processor 108 is also configured to communicate with one or more different types of memory 110 that can be utilized to store image data and/or contain machine readable instructions utilized to configure the processor to perform processes including (but not limited to) the various processes described below. The processor 108 may also be connected to a network via a network connection 106 to communicate with other processing systems connected to the network. The display 112 can be utilized by the processor 108 to present a user interface to a user and to display an image rendered using the light field image data. Although the processor is illustrated as a single processor, array cameras in accordance with embodiments of the invention can utilize a single processor or multiple processors including (but not limited to) a graphics processing unit (GPU).

In the illustrated embodiment, the processor 108 receives image data generated by the array camera module 102 and reconstructs the light field captured by the array camera module 102 from the image data. Sensors including multiple focal planes that can be utilized in the construction of array camera modules are discussed in U.S. patent application Ser. No. 13/106,797 entitled "Architectures for System on Chip Array Cameras", to Pain et al., the disclosure of which is incorporated herein by reference in its entirety. The processor 108 can manipulate the light field in any of a variety of different ways including (but not limited to) determining the depth and visibility of the pixels in the light field and synthesizing higher resolution 2D images from the image data of the light field.

In the illustrated embodiment, the imaging components 104 are configured in a 5×5 array. Each imaging component 104 in the array camera module 102 is capable of capturing an image of the view. The sensor elements utilized in the imaging components 104 can be individual light sensing elements such as, but not limited to, traditional CIS (CMOS Image Sensor) pixels, CCD (charge-coupled device) pixels, high dynamic range sensor elements, multispectral sensor elements and/or any other structure configured to generate an electrical signal indicative of light incident on the structure. In many embodiments, the sensor elements of the imaging components 104 have similar physical properties and receive light via the same optical channel and color filter (where present). In other embodiments, the sensor elements of the imaging components 104 have different characteristics and, in many instances, the characteristics of the sensor elements are related to the color filter applied to each sensor element. In several embodiments, the sensor elements of an imaging component includes a plurality of rows of pixels that also form a plurality of columns of pixels and the pixels of each imaging component are contained within a region of the sensor that does not contain pixels from another imaging component.

In many embodiments, an array of images (i.e. a light field) is created using the image data captured by the imaging components 104. As noted above, the processor 108 in accordance with many embodiments of the invention are configured using appropriate software to take the image data within the light field and synthesize one or more high resolution images. In several embodiments, the high resolution image is synthesized from a reference viewpoint, typically that of a reference imaging component 104 within the array camera module 102. In many embodiments, the processor is able to synthesize an image from a virtual viewpoint, which does not correspond to the viewpoints of any of the imaging components 104 in the array camera module 102. Unless all of the objects within a captured scene are a significant distance from the array camera, the images in the light field will include disparity due to the different fields of view of the focal planes used to capture the images. Processes for detecting and correcting for disparity when performing super resolution processing in accordance with embodiments of the invention are discussed in U.S. Provisional Patent Application Ser. No. 61/691,666 (incorporated by reference above). The detected disparity can be utilized to generate a depth map. The high resolution image and depth map can be encoded and stored in memory 110 in a light field image file. The processor 108 can use the light field image file to render one or more high resolution images. The processor 108 can also coordinate the sharing of the light field image file with other devices (e.g. via a network connection), which can use the light field image file to render one or more high resolution images.

Although a specific array camera architecture is illustrated in FIG. 1, systems and methods for performing calibration of an array camera in accordance with embodiments of the invention may be performed on any array camera configuration appropriate to the requirements of a specific application. Systems and methods for performing a calibration process for an array camera in accordance with embodiments of the invention are discussed below.

Calibration Process for an Array Camera

An array camera has features beyond those in a conventional camera that are characterized during calibration to assist super resolution processing algorithms to produce images of a desired resolution. The information obtained during calibration can include a Field of View (FoV) for each of the imaging components in the array and other information that relates one or more imaging components to one another. In many embodiments, the calibration process determines parameters utilized by driver software to adjust the imaging component alignment data that drives normalization and parallax compensation processing in preparation for super resolution processing. Typically, this information is obtained by using the imaging components in the array to capture images of specialized charts. These calibration processes often involve significant physical space and substantial data management to obtain useful information. The space and data management requirements can be a problem in the manufacturing process of an array camera, where both physical space and data storage can be at a premium.

To reduce the amount of physical space needed and data storage requirements for calibration, processes for calibrating an array camera in accordance with many embodiments of the invention involve capturing an image of a test pattern with each of the imaging components in the array. The captured images can be utilized to calibrate a reference imaging component, generate a corrected image of the test pattern based upon calibration information for the reference component, and calibrate each of the associate imaging components associated with the reference component. In this way, calibration can be performed where the calibration of the associate imaging components is performed with respect to the associated reference component using the corrected image generated for the reference component.

Figure 2:
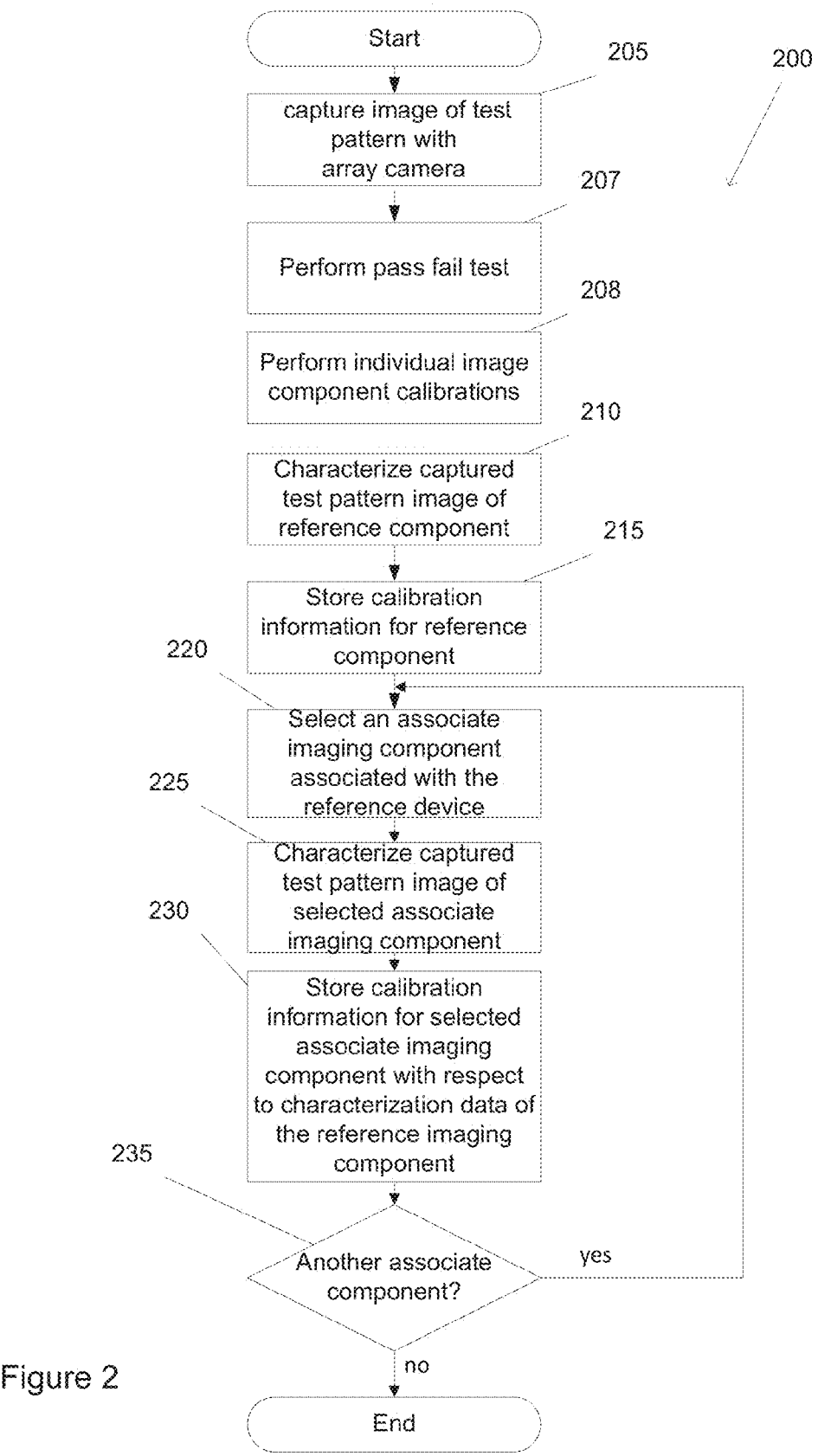
FIG. 2 illustrates a flow diagram of a calibration process for an array camera in accordance with an embodiment of this invention.

A process for calibrating an array camera in accordance with an embodiment of the invention is illustrated in FIG. 2. The process 200 includes capturing an image of a test pattern with the array camera (205). Each imaging component in the array camera captures an image of the test pattern. The test pattern has unique properties as discussed below with reference to FIG. 3. In many embodiments, the test pattern is placed at a distance farther away than 50% of the Hyperfocal (HF) distance of the array camera. In accordance with other embodiments, the test pattern is placed at a distance further away than 70% of the HF distance of the array camera. In accordance with still other embodiments, the test patent is a placed a distance from the array camera equal to the average of the HF distances of the individual lens stacks of the imaging components. In most embodiments, the HF distance will be in a range of 20-60 cm or 7.9-23.6 inches away from the array camera. One skilled in the art will recognize that the exact distance requirements will depend on the analysis methods used to calibrate the imaging components and the configuration of the array camera. In a number of the embodiments, the distance between the array camera and the test pattern is sufficient to produce a captured image of a checkerboard pattern with sufficient sharpness to determine a relative position of an object in the captured image to a fraction of a pixel. In some embodiments, the position may be determined within 0.5 of the pixel position or less. In other embodiments, the position may be determined within 0.25 of the pixel position or less. The distance between the array camera and the test pattern can also be used to determine the parallax shift between the imaging components to aid in determination of the relative spatial performance between the imaging components.

After the images are captured, the images captured by each of the imaging components may be stored in a memory and processed locally in real time or used by an off-line calibration process that can be performed by another processing system or by the processor in the array camera. Furthermore, the images of the test pattern captured by the imaging components in the array camera may be transmitted from the processor 108 of the array camera 100 to another processing system via a network connection 106 to allow the other processing system to perform the calibration process off-line. Various calibration processes that can be performed using the captured images in accordance with embodiments of the invention are discussed further below.

After each of the imaging components captures an image of the test pattern, some pass/fail tests may be performed (207) to provide gross operational sorting. The pass/fail tests may include but are not limited to, an image evaluation to verify proper image capture by the imaging components and/or to enable material sorting. The image evaluation may look for image levels within expected ranges, identify particular elements in each image such as fiducials (fiduciary markers) or edge detection in an expected area of the image. Failure to identify expected elements in a captured image may indicate a gross failure of the imaging component that captured the image. Other types of pass/fail test may also or alternatively be performed without departing from this invention.

Individual calibration processes may then be performed for each of the individual imaging components (208). These individual calibration processes may include, but are not limited, to colorimetric and photometric calibration processes. In accordance with some embodiments, a colorimetric calibration process is performed for each of the imaging components by evaluating Macbeth-style Color Checker patterns in the image of the test pattern captured by an imaging component. The values of these patterns in the image are compared to expected values and any deviation is identified and stored for use in the processing pipeline of the array camera. In accordance with some embodiments, the photometric calibration is performed in the following manner. The center of the image is identified based upon the relative brightness in the image. The center typically has the peak brightness of the image. The pixel data is then fitted to a cosine^4 curve using a least squares method. Photometric correction data is then determined by taking the difference between the fitted curve and the desired vignetting profile. The photometric correction data is then stored for use in the processing pipeline. Although specific colorimetric and photometric calibration processes are discussed above, any of a variety of colorimetric and/or photometric calibration processes can be utilized as appropriate to the requirements of specific applications in accordance with embodiments of the invention.

Characterization of the image of the test pattern captured by a reference imaging component in the array camera (210) is then performed to determine calibration information for the reference imaging component. A reference component is an imaging component in the array camera that is used as a reference for the calibration of one or more of the remaining associate imaging components in the array. In the described embodiment, the array camera only includes one reference component. However, an array camera may include more than one reference imaging component. When the array camera includes more than one reference imaging component, the characterization of the image of the test pattern (210) is repeated for images captured by each of the reference components. Various processes for characterization of the image of the test pattern captured by a reference component in accordance with embodiments of the invention are described below with reference to FIG. 4. The calibration information for the reference imaging component(s) is then stored (215).

After the image of the reference component(s) is characterized, a process for calibrating each of the associate imaging components associated with each reference imaging component can be performed. First, an associate imaging component associated with the reference component is selected (220). The test pattern image captured by the selected associate imaging component is characterized (225) to determine calibration information for the associate imaging component with respect to the reference imaging component. In many embodiments, the calibration information includes scene independent geometric corrections to account for distortions introduced by the mechanical construction of each imaging component. The calibration information is then stored for the selected associate imaging component (230). The process then determines whether the array camera includes another associate imaging component associated with the reference component (235). If there is another imaging component from the array camera associated with the reference component, the process (220-235) is repeated for the next associate imaging component. If there are no other associated imaging components associated with the reference component, process 200 ends. In some embodiments with more than one reference component, calibration of associate imaging components (220-235) is repeated for each particular reference component and the associate components associated with the particular reference component until the calibration process has been performed for all of reference imaging components and its associated associate components in the array camera.

Figure 3:
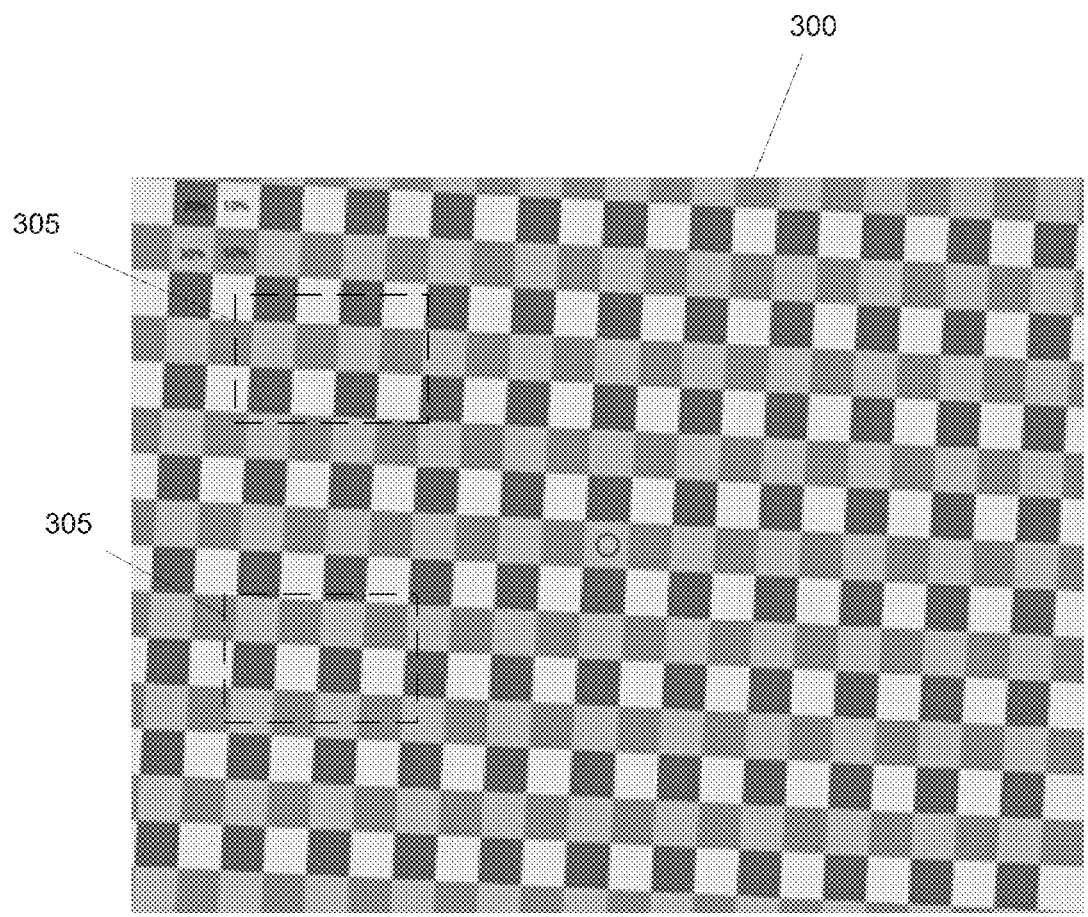
FIG. 3 illustrates a test pattern for use in a calibration process for an array camera in accordance with an embodiment of this invention.

A test pattern that can be used in a calibration process in accordance with embodiments of this invention is illustrated in FIG. 3. The test pattern 300 has a low contrast slanted edge pattern. As shown, the test pattern 300 has a checkerboard pattern providing the low contrast slanted edge pattern. The test pattern 300 changes with a high enough frequency to provide a sufficient number of correlation points to identify an expected level of low-frequency non-uniformities in the optical systems of the imaging components. Macbeth Color Chart patterns 305 are inset at different positions in the test pattern 300 to enable color uniformity checks. In accordance with some embodiments, the test pattern 300 may not include other fiducial elements as the slant edge intersections provide a sufficient number of identifiable points to perform the calibration process.

Characterization of an Image of a Test Pattern

Figure 4:
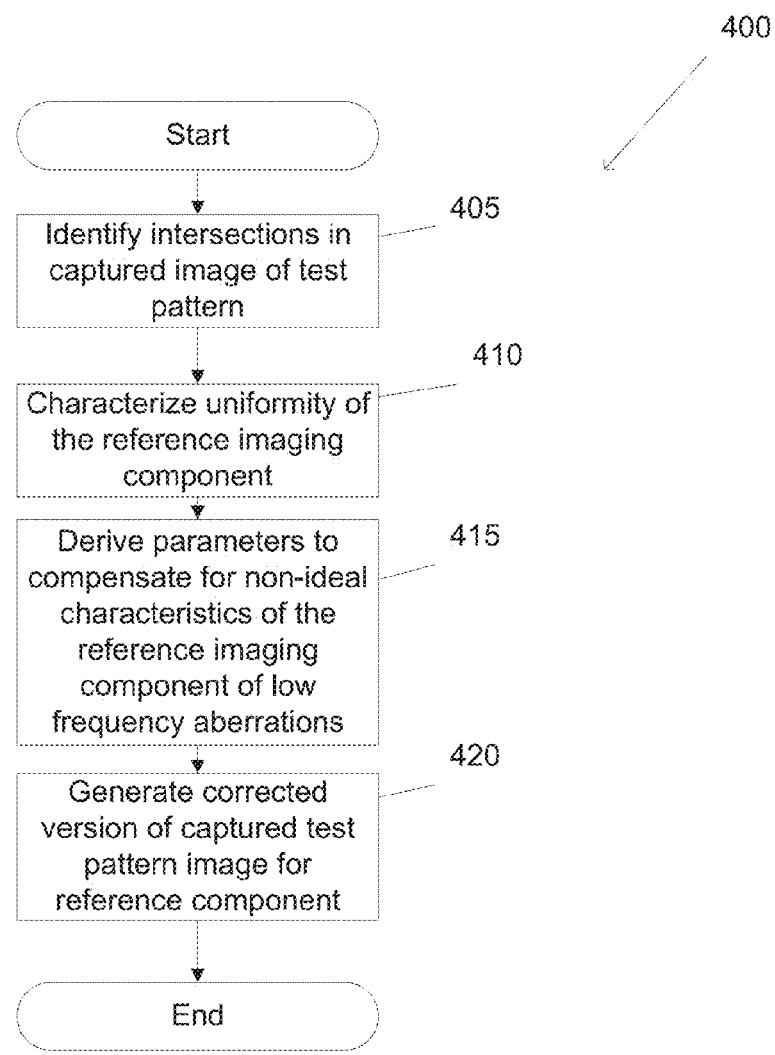
FIG. 4 illustrates a flow diagram of a process for calibrating a reference imaging component in accordance with embodiments of this invention.

A process for characterization of an image of the test pattern captured by a reference imaging component to determine the calibration information for the reference component in accordance with embodiments of this invention is illustrated in FIG. 4. The process includes identifying intersections of the test pattern in the captured image (405), characterizing uniformity of the reference camera (410), deriving parameters to compensate for low frequency aberrations (415), and generating a corrected version of captured image of the test pattern (420).

The identification of the intersections of the test pattern in the captured image (405) is performed by determining the pixel positions of the intersections in the test pattern in the captured image using a conventional corner-detection algorithm such as, the Harris corner detector or the Shi and Tomasi minimum eigenvalue method. In accordance with some embodiments, the intersection points are determined to sub-pixel accuracy. In some of these embodiments, the position of the intersection points is determined to an accuracy of 0.5 of a pixel position or less. In other of these embodiments, the position of the intersection points is determined to an accuracy of 0.25 of a pixel position or less. In other of these embodiments, position is determined to an accuracy of 0.1 of a pixel position or better.

The positions of the intersections in the test pattern are then used to characterize the uniformity of the reference component (410) included in the calibration information for the reference component. The uniformity of the reference imaging component is characterized with respect to the "as-designed" performance of the reference imaging component. The characterization is performed by comparing the determined points to an expected placement based on the test pattern. The comparisons are used to measure image translation (due to the imaging component), radial geometric distortion and other residual geometric perturbations. Correction parameters are then derived to compensate for the measured distortions. In many embodiments the correction parameters are scene independent geometric corrections that are applied to image data captured in specific pixel locations by the reference imaging component.

The positions of intersection points of the test patterns are then used in deriving parameters to compensate for low frequency aberrations (420) to include these parameters in the calibration information. These parameters include, but are not limited to, X and Y translations to correct for imager rotation; a $3^{rd}$-order radial translation to correct pin-cushion or barrel distortions; and/or a $5^{th}$-order radial translation to correct mustache or wave distortions. In other embodiments, any of a variety of parameters can be determined to correct for any of a number of different distortions as appropriate to the requirements of a specific application.

The calibration information including the characterization information and compensation parameters are then used to manipulate the captured image of the test pattern to generate a corrected image of the test pattern (425). The corrected image can be used to calibrate each of the associate imaging components associated with the reference imaging component. Process 400 then ends.

Calibrating an Associate Imaging Component

Figure 5:
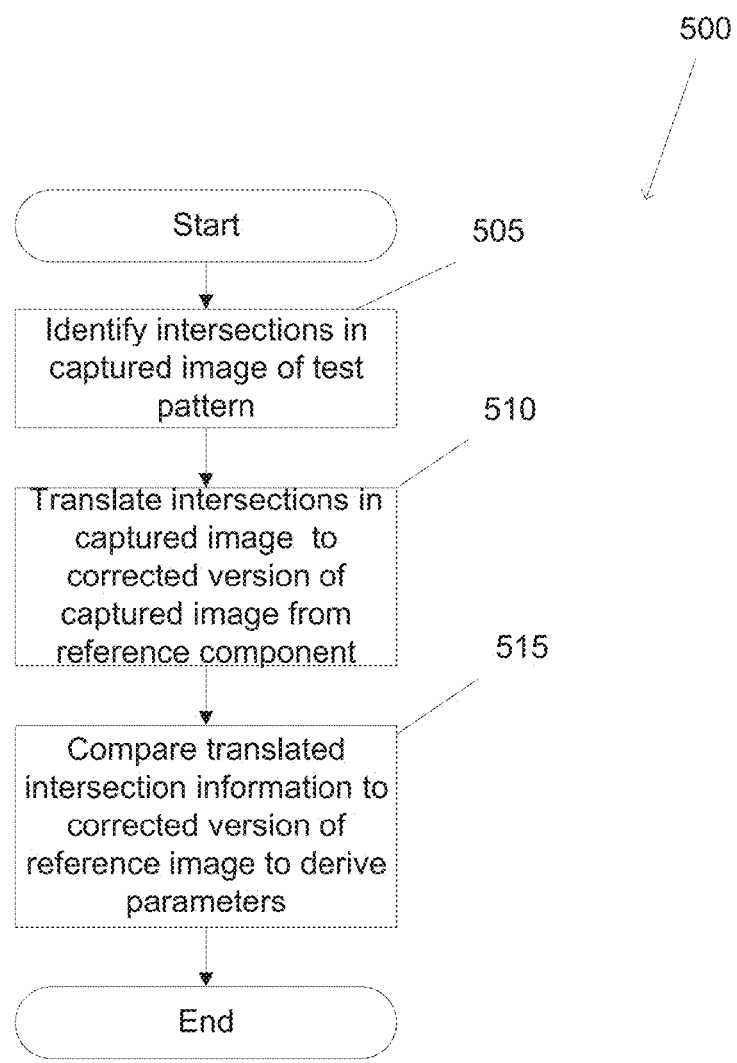
FIG. 5 illustrates a flow diagram of a process for calibrating an associate imaging component with respect to a reference imaging component in an array camera in accordance with embodiments of this invention.

A process for calibrating an associate imaging component using a corrected image of the test pattern derived from the calibration of the reference component to which the associated component is associated in accordance with embodiments of this invention is illustrated in FIG. 5. Process 500 includes identifying the positions of the intersections in the test pattern in the image captured by the associate imaging component (505), translating the positions of identified intersection points to account for the expected parallax shift between the associate imaging component and the reference imaging component (510), and comparing the translated positions of intersection points to the positions of the intersection points in the corrected image of the test pattern of the reference component to derive scene independent geometric correction data included in the calibration information for the associate imaging component (515).

The identification of positions of the intersections of the test pattern in the captured image (505) is performed by determining the positions of the intersections using a conventional alignment algorithm such as those described above. In accordance with some embodiments, the positions of the intersections are determined to sub-pixel accuracy. In some of these embodiments, the position of the intersection points is determined to an accuracy of 0.5 of a pixel position or less. In other of these embodiments, the position of the intersection points is determined to an accuracy of 0.25 of a pixel position or less. In still other of these embodiments, the position of the intersection points is determined to an accuracy of 0.1 of a pixel position or less.

The position of the identified intersection points are then translated to account for the expected parallax shift between the associate imaging component and the reference imaging component (510). The expected parallax shift is based upon the sensor design parameters, the behavior of the particular sensor optics, and calibration test parameters. The sensor design parameters include, but are not limited to, the physical offset of the particular associated imaging component to the reference imaging component. The behavior of the sensor optics includes, but is not limited to, the radial distortion of the relative parallax shift from a strictly rectilinear translation. The calibration test parameters include, but are not limited to, the distance of the test pattern from the array camera when the image is captured.

The comparison of the translated positions of the identified intersections for the associate component image to positions of corresponding intersection points in the corrected image of the reference imaging component (515) is performed. X and Y offset information for each identified intersection is determined relative to the position of the intersection in the corrected image. The X and Y offset information for all of the intersection positions for the reference imaging component can then be used to create scene independent geometric correction information. The correction information may be represented by a grid that provides a geometric correction prescription for the pixels of the associate imaging component to derive the appropriate parameters for the associate imaging component. The calibration information including the appropriate parameters can then be used during normal operation to correct distortions in the image data captured by the associate imaging component.

Although specific processes are described above with respect to FIGS. 4 and 5 with respect to determining scene independent geometric corrections during the calibration or reference and associate imaging components in an array camera, any of a variety of processes can be utilized to determine scene independent geometric corrections as appropriate to the requirements of a specific application in accordance with embodiments of the invention.

While the above description contains many specific embodiments of the invention, these should not be construed as limitations on the scope of the invention, but rather as an example of embodiments thereof. Accordingly, the scope of the invention should be determined not by the embodiments illustrated, but by the appended claims and their equivalents.

What is claimed:

1. A method for calibrating an array camera including a plurality of imaging components, the method comprising:
   capturing an image of a test pattern using the array camera wherein each of the plurality of imaging components of the array camera captures an image from a particular viewpoint;
   generating scene independent geometric corrections for the image data captured by a first one of the plurality of imaging components in the array camera using data of the image of the test pattern captured by the first one of the plurality of imaging components and data describing the test pattern using a processor;
   generating a corrected image of the test pattern for the first one of the plurality of imaging components based on the scene independent geometric corrections for the image data captured by the first one of the plurality of imaging components and the image of the test pattern captured by the first one of the plurality of imaging components using the processor; and
   generating scene independent geometric corrections for the image data captured by a second one of the plurality of imaging components using the data of image of the test pattern captured by the second one of the plurality of imaging components and data for the corrected image of the of the test pattern of the first one of the plurality of imaging components using the processor.

2. The method of claim 1 wherein the test pattern includes a low-contrast slanted edge pattern.

3. The method of claim 2 wherein the test pattern includes a plurality of Macbeth Color Chart type patterns inset at different positions in the low-contrast slanted pattern.

4. The method of claim 1 wherein the test pattern is at a distance of at least 70 percent of the hyperfocal distance of the array camera away from the array camera during the capturing of the image of the test pattern.

5. The method of claim 1 wherein the test pattern is at a distance of at 50 percent of the hyperfocal distance of the array camera away from the array camera during the capturing of the image of the test pattern.

6. The method of claim 1 further comprising performing at least one pass/fail test of the array camera based on images of the test pattern captured by the plurality of imaging components in the array camera.

7. The method of claim 1 wherein generating scene independent geometric corrections for the image data captured by the first one of the plurality of imaging components using data of the image of the test pattern captured by the first one of the plurality of imaging components and data describing the test pattern comprises:
   identifying intersection points in the image of the test pattern captured by the first one of the plurality of imaging components;
   determining the uniformity characteristics of the second one of the plurality of imaging components from the identified intersection points in the image of the test pattern captured by the second one of the plurality of imaging components and the test pattern; and
   deriving a set of geometric corrections for the first one of the plurality of imaging components to compensate for low frequency aberrations in the captured image of the test pattern.

8. The method of claim 1 wherein generating scene independent geometric corrections for the image data captured by the second one of the plurality of imaging components comprises:
   identifying intersection points in the test pattern image captured by the second one of the plurality of imaging components;
   translating the intersection points from the captured test pattern images captured by second one of the plurality of imaging components in accordance with an expected parallax shift for the second one of the plurality of imaging components relative to the first one of the plurality of imaging components; and
   deriving a set of geometric corrections for the second one of the plurality of imaging components to compensate for low frequency aberrations in the captured image of the test pattern by comparing the translated intersections points in the image captured by the second one of the plurality of imaging components to corresponding intersection points in the corrected image for the first one of a plurality of imaging components.

9. The method of claim 8 wherein the expected parallax shift for the second one of the plurality of associate imaging components is based upon at least one of the physical offset of the second one of the plurality of imaging components to the first one of the plurality of imaging components, the behavior of sensor optics in the second one of the plurality of imaging components, and distance of the test pattern from the array camera.

10. The method of claim 1 further comprising storing the images captured by the plurality of imaging components to perform the calibration of the first of the plurality of imaging component and the second one of the plurality of imaging components at a later time.

11. The method of claim 1 further comprising storing the scene dependent geometric correction information for the image data captured by the first one of the plurality of imaging components in a memory.

12. The method of claim 1 further comprising storing the scene dependent geometric correction information for the image data captured by second one of the plurality of imaging components in a memory.

13. The method of claim 1, further comprising generating colorimetric corrections for the image data captured by each imaging component in the array camera using data of the image of the test pattern captured by the each of the plurality of imaging components using the processor.

14. The method of claim 1, further comprising generating photometric corrections for the image data captured by each of the plurality of imaging components in the array camera using data of the image of the test pattern captured by the first one of the plurality of imaging components using the processor.

15. A device for calibrating an array camera including a plurality of imaging components comprising:
a memory; and
a processor configured via one or more applications stored in the memory to:
receive an image of a test pattern from each of the plurality of imaging components of the array camera;
generate scene independent geometric corrections for the image data captured by a first one of the plurality of imaging components imaging component using data of the image of the test pattern captured by the first one of the plurality of imaging components and data describing the test pattern;
generate a corrected image of the test pattern for the first one of the plurality of imaging components based on the scene independent geometric corrections for the image data captured by the first one of the plurality of imaging components and the image of the test pattern captured by the first one of the plurality of imaging components; and
generate scene independent geometric corrections for the image data captured by a second one of the plurality of imaging components using the data of image of the test pattern captured by each associate imaging component and the corrected image of the first one of the plurality of imaging components using the processor.

16. A machine readable medium containing processor instructions, where execution of the instructions by a processor causes the processor to perform a process for calibrating an array camera including a plurality of imaging components where the plurality of imaging components include a reference imaging component and a plurality of associate imaging components associated with the reference imaging component, the process comprising:
receiving an image of a test pattern captured by each of the plurality of imaging components of the array camera;
generating scene independent geometric corrections for the image data captured by a first one of the plurality of imaging components in the array camera using data of the image of the test pattern captured by the first one of the plurality of imaging components and data describing the test pattern using a processor;
generating a corrected image of the test pattern for the first one of the plurality of imaging components based on the scene independent geometric corrections for the image data captured by the first one of the plurality of imaging components and the image of the test pattern captured by the first one of the plurality of imaging components using the processor; and
generating scene independent geometric corrections for the image data captured by a second one of the plurality of imaging components using the data of image of the test pattern captured by the second one of the plurality of imaging components and data for the corrected image of the of the test pattern of the first one of the plurality of imaging components using the processor.

* * * * *